United States Patent [19]

Maffitt

[11] 3,723,978

[45] Mar. 27, 1973

[54] BEAM ADDRESSABLE MEMORY APPARATUS

[75] Inventor: Kent N. Maffitt, Minneapolis, Minn.

[73] Assignee: Minnesota Mining and Manufacturing Company, St. Paul, Minn.

[22] Filed: Mar. 1, 1971

[21] Appl. No.: 119,630

[52] U.S. Cl. ................340/173 CR, 313/67, 313/91, 315/30

[51] Int. Cl. .............................................G11c 11/26

[58] Field of Search......340/173 CR; 313/91, 84, 66, 313/67; 315/30

[56] References Cited

UNITED STATES PATENTS

| | | | |
|---|---|---|---|
| 3,176,278 | 3/1965 | Mayer | 340/174.1 R |
| 3,247,493 | 4/1966 | Wolfe | 340/173 TP |
| 3,278,679 | 10/1966 | Newberry | 340/173 |

*Primary Examiner*—Terrell W. Fears
*Attorney*—Kinney, Alexander, Sell, Steldt & Delahunt

[57] ABSTRACT

Beam addressable memory apparatus including an electron gun having a compound electrostatic immersion gun lens, a first set of electrostatic deflection plates, and a compound electrostatic immersion objective lens for writing charged bits of information on a storage media. During the reading mode, the storage media is negatively biased to mirror and spacially modulate the electron beam. The mirrored beam is passed back through the objective lens, a second set of electrostatic deflection plates, and a projector lens onto a detector array for producing simultaneous digital electrical signals corresponding to the bit pattern on the media.

10 Claims, 12 Drawing Figures

INVENTOR.
KENT N. MAFFITT
BY Kinney, Alexander, Sell, Steldt & DeLaHunt
ATTORNEYS INVENTOR.
KENT N. MAFFITT
BY Kinney, Alexander, Sell, Steldt & DeLaHunt
ATTORNEYS INVENTOR.
KENT N. MAFFITT
BY Kinney, Alexander, Sell, Steldt & De La Hunt
ATTORNEYS INVENTOR.
KENT N. MAFFITT
BY Kinney, Alexander,
Sell, Steldt & DeLa Hunt
ATTORNEYS

BEAM ADDRESSABLE MEMORY APPARATUS

BACKGROUND OF THE INVENTION

Several electron beam computer memory systems are known for storing a large quantity of information at a high density. These known electron beam memory systems have a number of disadvantages such as destructive read-out requiring re-writing following each read-out, the need to register a finely focused beam very accurately to prevent erroneous read-out, and can commonly require a rather high minimum energy density per bit to maintain error free read-out.

Electron mirror read-out systems provide the advantages of non-destructive read-out and operation with small energy densities per bit on the storage media that yield faster writing and minimize the interaction between stored bits. Two different approaches to electron mirror read-out are illustrated in U.S. Pat. No. 3,176,278 (Mayer) and U.S. Pat. No. 3,278,679 (Newberry).

In the Mayer apparatus, small areas on a premagnetized medium are demagnetized (by a technique known as Curie point writing) in a predetermined pattern to indicate information thereon. This written pattern is then read by flooding and mirroring electrons from the entire medium to form a large beam of information carrying electrons. One disadvantage of this specific system is the slow read-out rate caused by the need for a large cross-sectional monoenergetic electron reading beam, which limits the available beam current density, resulting in the large beam of mirrored electrons being slowly (to provide a detectable signal) and sequentially scanned into a detector. Another characteristic which also reduces the operational speed of Mayer's system is the non-uniform, low image contrast which results from the interaction of mirrored electrons with a magnetic surface. A further disadvantage is that the electrons mirrored from the center area of the magnetized medium carry no information relating to the information recorded in this center area.

The electrostatic mirror memory system of Newberry utilizes an electron beam to place electrical charges arranged in a predetermined intelligence conveying pattern on a dielectric medium. This information is subsequently read-out, bit by bit, by a time sequential scanning mirrored electron beam having a diameter corresponding to the diameter of the stored bit. The mirrored beam has time varying energy variations as a result of the lateral deflection of the beam, caused by scanning the beam over the stored bits. These energy variations are detected by filtering the mirrored beam through an energy analyzer and producing a modulated time varying current corresponding to the charge pattern on the media at some detector. This system provides an inherently slow bit-to-bit reading rate further limited by the total current that can be focused into a small mirrored spot. Thus, as the bit size decreases the available current decreases resulting in a still slower read-out rate. Another factor decreasing Newberry's rate of read-out is the requirement that very small fractional changes in the total energy of the beam must be slowly measured to prevent excessive reading error. Still another disadvantage of this system is that very precise alignment of the beam relative to the energy filter is necessary to prevent erroneous beam energy variations from causing extraneous modulation of current collected at the detector.

THE PRESENT INVENTION

The non-destructive information retrieval apparatus, as disclosed herein, provides simultaneous read-out of information sites with a mirrored electron beam. The simultaneous reading of a plurality of information sites within an information area provides a high bit read-out rate. In addition, the simultaneous read-out allows instantaneous address and error checking of the information contained within each information area and permits the recording of data in a redundant recorded form allowing either error determination or correction. Thus, any errors in beam registration are instantaneously detected to permit appropriate corrections in beam position. Since each information area may contain its own address, random access to any given information area is readily accomplished. The present apparatus also provides a high sensitivity to small concentrations of charge. For example, bits containing $10^{-13}$ and $10^{-14}$ coulombs are easily detected.

The present invention can be summarized as including a medium having a plurality of information areas wherein each said area includes a distribution of information sites arranged in a predetermined pattern and the medium is capable of having information bits at such sites. An electron means produces an electron beam having a controlled cross section of sufficient area to be affected by the information sites within an information area while the medium is negatively biased to mirror said electron beam and spacially modulate the mirrored beam in an arrangement corresponding to the stored bit pattern. A detector means converts the modulations simultaneously of said mirrored beam into electrical signals corresponding to the bit pattern on the medium.

BRIEF DESCRIPTION OF THE PREFERRED EMBODIMENT

This invention will become better understood by reference to the following description when considered in connection with the accompanying drawings in which like numerals designate like parts throughout the figures and wherein.

DETAILED DESCRIPTION OF THE PREFERRED EMBODIMENT

Figure 1:
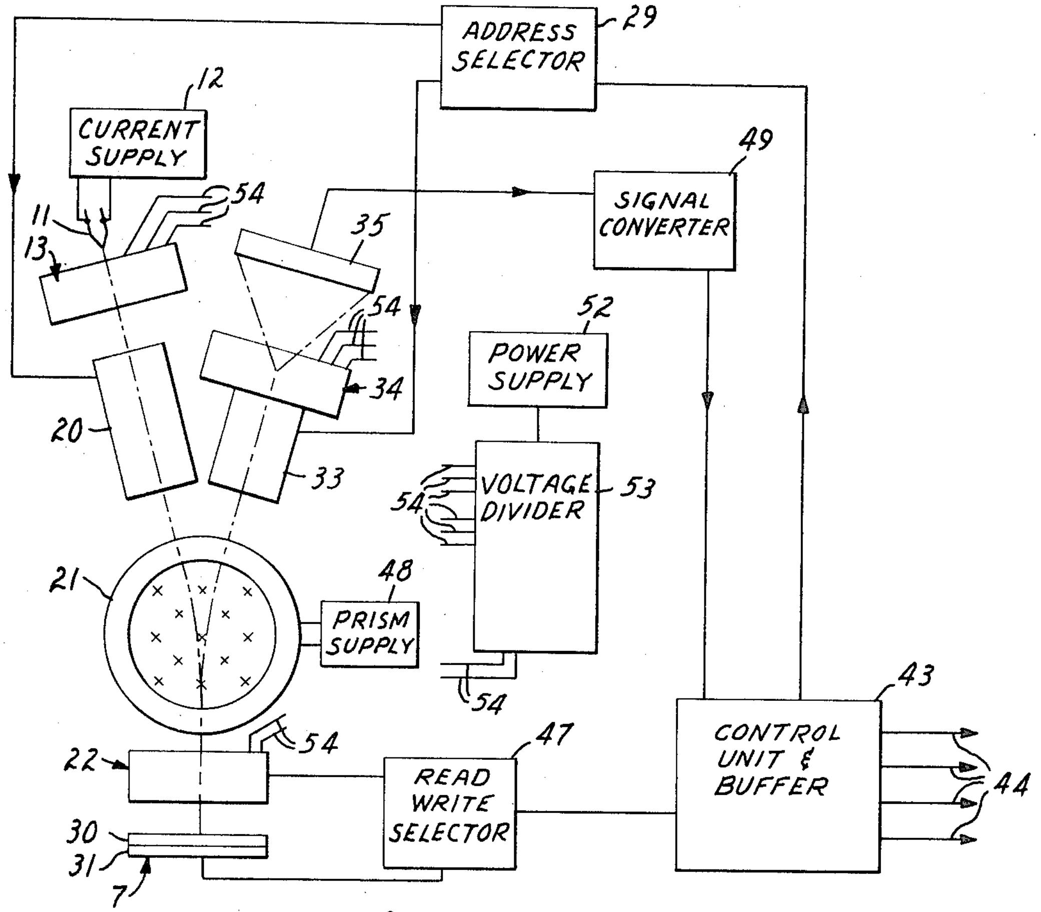
FIG. 1 is a block diagram of the electrical components of the preferred embodiment.

In referring to the beam addressable memory apparatus as illustrated in FIG. 1, well collimated, monoenergetic electrons are used to place charged bits of information on the storage medium 7 at specific information sites 8 (See FIG. 3) within an addressed information area 9 or to simultaneously read all information sites 8 within an addressed information area 9. Although the preferred embodiment utilizes the concept of storing for an appreciable length of time charge bits of information on the medium, the present invention encompasses the concept of having a pattern of information bits at a medium while the subject information area is being read by the retrieval apparatus.

WRITE MODE

Figure 2:
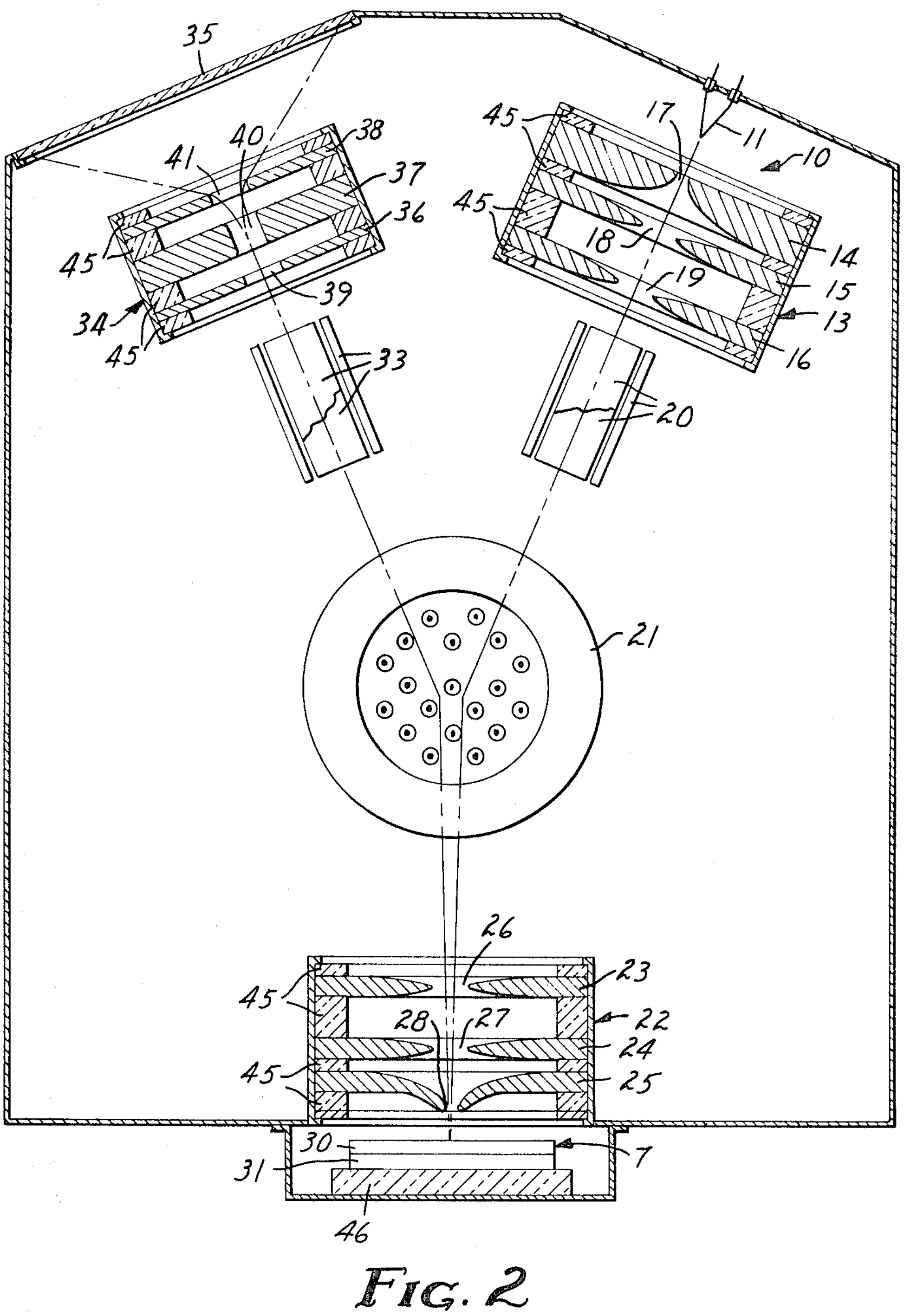
FIG. 2 is a schematic illustration of the compound lens and deflection plates as used in the preferred embodiment.

In referring to FIG. 2, the electron gun 10 includes a pointed thermal cathode 11 at ground potential heated by a suitable current supply 12 (FIG. 1); such a supply is well known in the art. In the write mode, the cathode 11 supplies a current of electrons in the order of 0.1 microamps ($\mu$a).

A compound electrostatic immersion gun lens 13 is composed of three coaxially aligned apertured elements 14, 15, 16 suitably spaced and biased. Element 14 is a titanium disk 12 mm thick having a 30° tapered center portion with a 3 mm aperture 17 and biased to a positive potential of 0.19 of the accelerating potential of the electron beam. Element 15 is a titanium disk 3 mm thick having a 10 mm aperture 18 and biased to a potential of 0.14 of the accelerating potential, and element 16 is also a titanium disk 3 mm thick having a 10 mm aperture 19 and biased to the maximum energy of the electron beam which in the specific example is 20 kilo electron volts (20 KeV). Element 14 is spaced 10 mm from the cathode 11 and 3 mm from element 15. Elements 15, 16 have a 10 mm spacing therebetween. Each element 14, 15, 16 is highly polished, all edges have suitable radiuses to prevent high voltage breakdown, and are electrically separated by glass insulators 45.

Upon leaving the gun lens 13, the electron beam having a diameter of approximately 500 microns passes between a first set of four opposed electrostatic deflection plates 20 which are utilized to control the position of the electron beam at the medium 7. Each stainless steel plate 20 is 3 mm thick, 25 mm wide, 10 cm long and spaced 10 cm apart on opposite sides of the electron beam.

The electron beam is deflected through a 11° angle by the magnetic field (shown inwardly in FIG. 1 and outwardly in FIG. 2) of two Helmholtz coils 21, positioned above and below the electron beam path. Each coil 21 has 94 turns of wire with an average radius of 8 cm and provide an average field intensity of 3.2 gauss over a path length of 29 cm when carrying a current of approximately 1 amp. The coils 21 are powered by prism supply 48.

The electron beam then enters a compound electrostatic immersion objective lens 22 at an angle relative to the lens axis determined by the deflection plates 20. The objective lens 22 includes three coaxially aligned apertured elements 23, 24, 25 suitably spaced and biased. Element 23 is a titanium disk 3 mm thick having a 10 mm aperture 26 and biased to the accelerating potential of 20 KeV and element 24 is also a titanium disk 3 mm thick having a 10 mm aperture 27 and biased to 0.13 of the accelerating potential. Element 25 is a titanium disk 6 mm thick having 30° conical center portion with a 3 mm aperture 28 and biased to the accelerating potential of the electron beam (20 KeV). Element 25 is spaced 16 mm from the surface of the storage medium 7 and 3 mm from element 24. Elements 23, 24 have a 10 mm spacing therebetween. Each element 23, 24, 25 is highly polished, all edges have suitable radiuses to prevent high voltage breakdown, and are electrically separated by glass insulators 45.

The storage medium 7 includes a dielectric material 30 for storing thereon information bits commonly in the form of charge bits, and a smooth conductive plate 31. In the present apparatus, a film of bismuth titanate ($Bi_4Ti_3O_{12}$) was used as a dielectric material 30 to provide a long storage time as a result of its combined high dielectric constant and high resistivity. Thus, storage times in excess of 50 hours have been obtained. This film of bismuth titanate is sufficiently thin, less than one micron in thickness, to allow control of the surface potential during writing and yet capable of storing sufficient detectable concentrations of charge at the surface. The thickness of the film should be equal to or less than the maximum lateral dimension of the charged bit to reduce lateral charge motion during storage. The conductive plate 31, which has been successfully formed of gold-coated glass, is insulated from the housing by the glass insulator 46.

Figure 3:
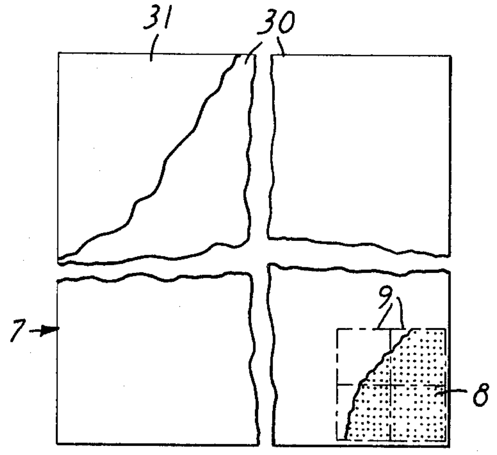
FIG. 3 is a view of the dielectric storage material, with an electrically conductive backing plate, illustrating information areas having information sites arranged in a predetermined pattern.

In the writing mode, and in referring to FIGS. 1 and 5A – 5C, the electron gun 10 produces a well collimated monoenergetic beam of electrons (0.1 $\mu$a) deflected by the deflection plates 20 as controlled by the address selector 29 to write information in the form of charged bits at information sites 8 (see FIG. 3) within selected information areas 9 of the storage medium 7. The storage medium 7, as illustrated in FIG. 3, is divided into a plurality of information areas 9 wherein each information area 9 contains its own predetermined pattern of information sites 8. The pattern illustrated is a 8 × 8 site arrangement and it should be readily apparent that other patterns could be utilized.

Figures 5A, 5B, 5C, 6A, 6B, 6C:
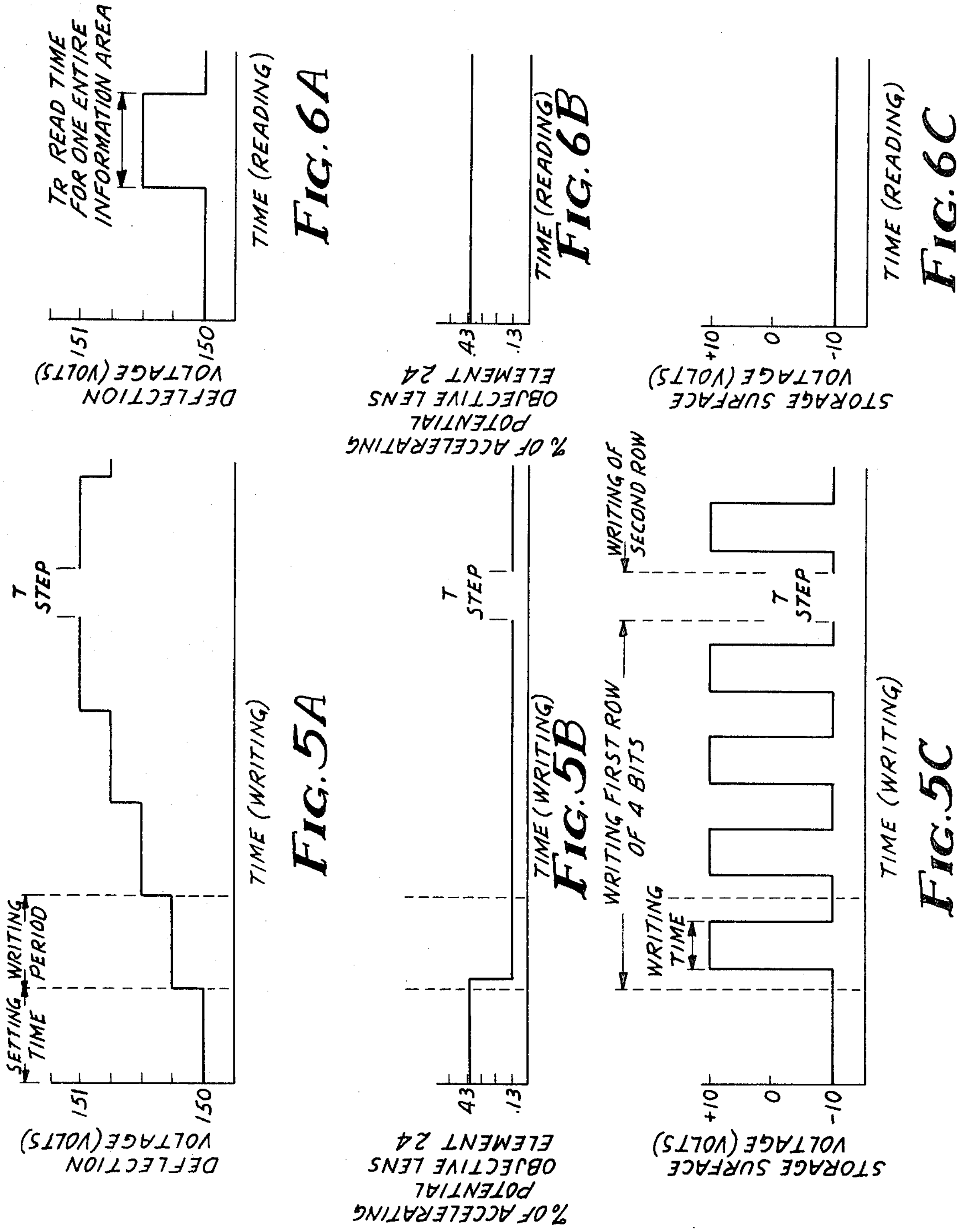
FIGS. 5A, 5B and 5C represent the time dependent voltage on the deflection plates, objective lens and storage medium during the writing of individual bits within an information area.
FIGS. 6A, 6B and 6C represent the time dependent voltage on the deflection plates, objective lens and storage medium during the simultaneous reading of an information area.
Figure 7:
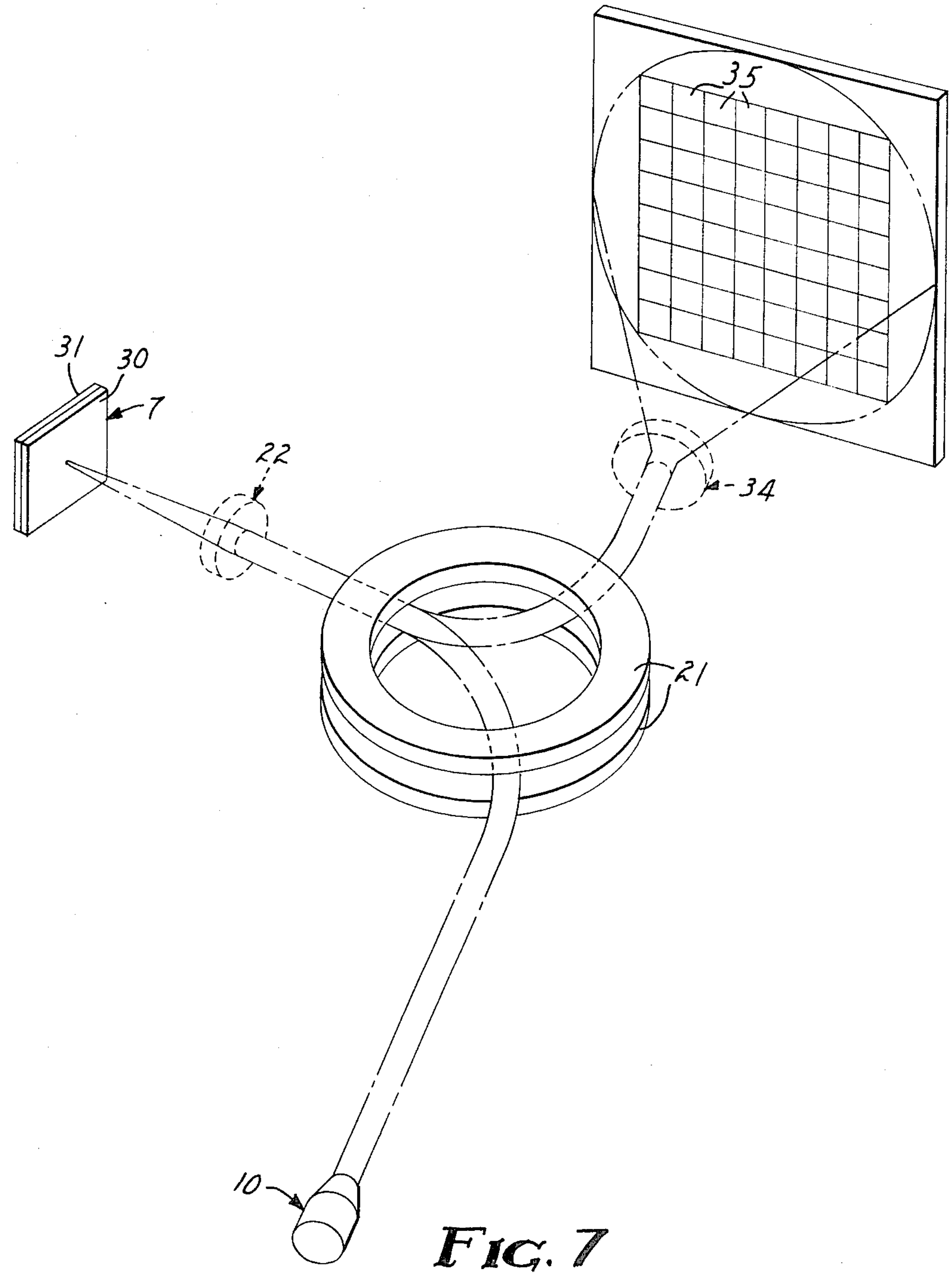
FIG. 7 is a diagrammatic illustration of the beam addressable memory apparatus in the read mode.

In order to write on the medium 7, the deflection voltage on the plates 20, the voltage on objective lens element 24 and the bias on the conductive backing 31 must be sequentially set to the selected values such as shown in FIGS. 5A – 5C. The voltage on the objective lens element 24 is adjusted to 0.13 of the accelerating potential by the read-write selector 47 and simultaneously the beam is deflected to the first writing position by the 150 volts impressed on the deflection plates 20 by the address selector 29. The storage medium 7 is subsequently biased by the selector 47 to a positive 10 volts for a sufficient period of time, approximately 2 micro-seconds, to deposit a readable bit of charge (approximately $10^{-13}$ to $10^{-14}$ coulombs) on the medium 7 (see the beam profiles of FIGS. 4A and 4B). The storage medium 7 is then biased to minus 10 volts and the deflection voltage is stepped to deflect the beam to the next writing position and the cycle is repeated for each charge bit of information written on the storage medium 7. Throughout the writing mode, the objective lens element 24 is maintained at 0.13 of the accelerating potential. Upon reaching the last information site in the subject row of sites, and in this illustration being the fourth charge bit, the deflection plates 20 are suitably biased by the address selector 29 to deflect the beam to the next row of the bit pattern. This stepping time is represented by T step as shown in FIGS. 5A – 5C. After T step, the storage medium 7 is again biased to plus 10 volts to deposit a charge bit at the next information site 8. The cycle is repeated until all desired bits have been properly placed at information sites 8 within an information area 9 forming an information bearing bit pattern for subsequent read-out. Not all information sites 8 will necessarily be charged to complete the predetermined information pattern.

Figures 4A, 4B:
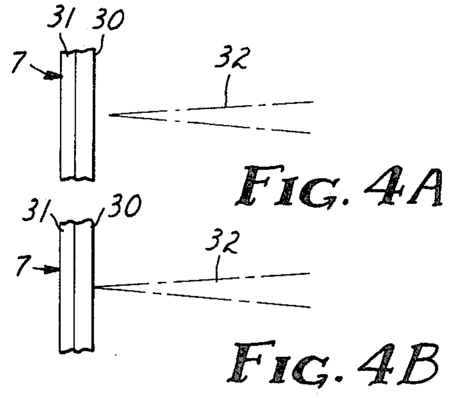
FIGS. 4A and 4B illustrate the electron beam profile, adjacent the storage medium, during the writing mode.

During the writing mode, the electron beam adjacent to the medium 7 has a profile 32 as shown in FIGS. 4A, 4B. FIG. 4A represents the profile of the beam between writing pulses and illustrates that the apex of the beam terminates close to the storage medium 7. The apex is thought to be spaced approximately 8 microns from the medium 7 and have a diameter in the order of 3 microns. FIG. 4B represents the beam impinging upon the medium 7, to place a charge bit at a specific information site 8, during a write pulse. The charge bit has a diameter of approximately 3 microns.

READ MODE

During the read mode, as illustrated in FIGS. 1, 2, 6A – 6C and 7, cathode conditions are adjusted to provide a beam current of approximately 10 μa, the voltages on the gun lens elements 14, 15, 16 are unchanged from writing voltages, the bias of objective lens element 24 is increased to 0.43 of the accelerating potential (again 20 KeV) and the storage medium 7 is biased to 10 volts negative relative to the cathode 11. As a result of increasing the bias on element 24, the beam cross-section is increased to approximately 100 microns near the storage media 7 as diagrammatically illustrated in FIG. 7. Since the beam diameter encompasses an entire information area 9, the mirrored beam is influenced simultaneously by all information sites 8 within area 9. Each charge bit modulates the density of the mirrored beam in the locality immediately adjacent it. Thus, a pattern of density modulations is produced within the mirrored beam cross-section. For reading the entire medium 7, a suitable voltage is applied to the deflection plates 20 to deflect the beam to each selected information area 9.

After mirroring, the mirrored beam passes back through the objective lens 22 into the magnetic field region where it is deflected 11° away from the incoming beam. The mirrored beam then passes between a second set of four opposed electrostatic deflection plates 33 which are used to align the mirrored beam with the axis of a projector lens 34. Each stainless steel plate 33 is 3 mm thick, 25 mm wide, 10 cm long and spaced 10 cm apart on opposite sides of the mirrored electron beam. The voltages applied to these deflection plates to make the necessary alignments are determined by the address selector 29. The mirrored beam then passes through the projector lens 34 to cause the beam cross-section to be enlarged approximately 30 times at the detector array 35 (see FIG. 7).

The projector lens 34 includes three coaxially aligned apertured elements 36, 37, 38. Element 36 is a titanium disk 3 mm thick having a 12 mm aperture 39 and biased to the accelerating potential. Element 37 is a titanium disk 9 mm thick having a 9 mm aperture 40 and biased to ground potential. Element 38 is a titanium disk 3 mm thick having a 12 mm aperture 41 and biased to the accelerating potential.

The enlarged pattern of density modulations is read-out by an array of detectors 35 which has configuration corresponding to a magnified geometry of the bit pattern on the storage medium 7. Since there is a detector for each information site 8 within an information area 9 viewed by the mirrored beam, all bits within the information area 9 are sensed simultaneously by the detector array. In the preferred embodiment, the detector array includes 64 semiconducting Schottky diodes linked to a signal converter 49.

The signal converter 49 converts the spacial modulations, detected by detector array, into digital electrical signals transmitted to the control unit and buffer 43. The buffer 43 relays the information to the main computer in a form compatible with the computer as illustrated by leads 44 of FIG. 1. The control unit 43 also includes a feedback circuit for correcting erroneous positioning of the beam on the medium 7.

As illustrated in FIGS. 6A – 6C, during the reading of the information placed on the storage medium via the writing steps illustrated in FIGS. 5A – 5C the storage surface is maintained at minus 10 volts, the objective lens element 24 is maintained at 0.43 of the accelerating potential, and the read beam is deflected to the desired information area by the 150.5 volts on the deflection plates 20. For a sufficient read time (T*r*), approximately 2 micro seconds, the read beam is mirrored from the selected information area and the data therefrom is transmitted to the buffer 43 via the detectors 35.

As shown in FIG. 1, a power supply 52 and voltage divider 53 supply the necessary voltages to the lens elements of the gun, objective and projector lens 13, 22, 34 via the leads 54.

As shown in FIG. 2, the electron optical components and storage medium 7 are secured within a housing evacuated to a pressure of $10^{-8}$ torr by suitable vacuum pumps (not shown). The electrical wires and cables connecting the exterior electronic components to the electron optical components have not been shown in detail for sake of brevity.

While one embodiment has been described in detail, it is appreciated that this was for the purpose of illustration and that additional embodiments could be made without departing from the spirit and the scope of the invention as set forth in the appended claims.

What is claimed is:

1. An information retrieval apparatus providing simultaneous read-out of a plurality of information bits, comprising a. a medium having a plurality of information areas wherein each said area includes a distribution of information sites arranged in a predetermined pattern, said medium being capable of having information bits at said sites forming a bit pattern;

b. electron means for producing substantially monoenergetic electrons formed into an electron beam having a controlled cross section of sufficient area to be affected by said information sites within an information area;

c. deflection means for directing said electron beam toward a first information area;

d. means for negatively biasing said medium to mirror and spacially modulate the density of said mirrored beam in an arrangement corresponding to the stored bit pattern on said medium; and e. detector means to convert the density modulations simultaneously of said mirrored beam to electrical signals corresponding to the bit pattern on said medium.

2. An information retrieval apparatus according to claim 1 wherein said retrieval apparatus includes an address selector connected to said deflection means to selectively direct said electron beam toward a second information area to permit random access of desired information areas.

3. An information retrieval apparatus according to claim 2 wherein said retrieval apparatus includes feedback means for detecting errors in beam registration and correcting the position of said electron beam at said medium.

4. An information retrieval apparatus according to claim 1 wherein said electron means includes an electron gun producing a substantial current of monoenergetic electrons.

5. An information retrieval apparatus according to claim 1 wherein said electron means includes an objective lens means receiving said electron beam from said deflection means.

6. An information retrieval apparatus according to claim 5 wherein said objective lens means includes a positively biased apertured plate adjacent to said medium.

7. An information retrieval apparatus according to claim 5 wherein said objective lens means includes a compound electrostatic immersion lens formed of first, second and third plates spaced from each other and having coaxially aligned apertures.

8. An information retrieval apparatus according to claim 1 wherein said detector means includes a detector array formed of a plurality of individual detectors having a pattern corresponding to the distribution of information sites.

9. An information retrieval apparatus according to claim 8 wherein said detector array is physically enlarged relative to the distribution of information sites, and wherein said apparatus includes projector lens means for enlarging the diameter of said mirrored electron beam prior to said beam reaching said detector array.

10. An information retrieval apparatus according to claim 9 wherein said retrieval apparatus includes magnetic field means in front of said objective lens for causing separation of said mirrored electron beam from said electron beam.

* * * * *